UNITED STATES PATENT OFFICE.

ROBERT D. PIKE, OF SAN FRANCISCO, CALIFORNIA.

METHOD OF MANUFACTURING MAGNESITE REFRACTORIES.

1,312,871. Specification of Letters Patent. Patented Aug. 12, 1919.

No Drawing. Application filed October 23, 1917. Serial No. 198,087.

*To all whom it may concern:*

Be it known that I, ROBERT D. PIKE, a citizen of the United States, residing at the city and county of San Francisco and State of California, have invented certain new and useful Improvements in Methods of Manufacturing Magnesite Refractories, of which the following is a specification.

The present invention relates to an improved method of manufacture of magnesite refractories, such as magnesite bricks and shapes and so-called magnesite grain materials and magnesite cement from magnesite ores which are naturally deficient in such suitable materials as are required and necessary to give a dense, hard and strong physical structure to the refractory mass when subjected to firing temperatures used in commercial manufacture. Practically all magnesite mined in the United States is deficient in such necessary material, so that the same when mined and calcined is not suitable for refractory manufacture without the admixture of other material; this will be apparent by a comparison with the Austrian magnesite.

The following analyses of two typical California and one typical Austrian calcined magnesite will serve to make clear the difference in chemical composition of the two materials:

| Substance. | Austrian. | Calif. #1. | Calif. #2. |
|---|---|---|---|
| Magnesia $M_gO$ | 85 | 96.6 | 91 |
| Ferric oxid $Fe_2O_3$ | 8 | Trace. | 2 |
| Silica $SiO_2$ | 3 | .91 | 6 |
| Alumina $Al_2O_3$ | 2 | 1.31 | .5 |
| Lime CaO | 1.5 | 1.18 | .5 |
| Ignition loss | .5 | | Trace. |
| | 100.0 | 100.00 | 100.0 |

The chief difference in chemical constituents between the Austrian and California magnesite No. 2 resides in the ferric contents, while the California magnesite No. 1 is distinct in being very low in impurities with the magnesia (MgO) correspondingly high. The difference in physical properties shown when manufactured into a refractory material, such, for example, as a brick, between either of these typical California magnesites and the Austrian magnesite is remarkable. A brick made from the calcined Austrian magnesite, after being fired in a commercial kiln to cone 18 to 20, is hard, dense and of great physical strength, while a brick made from the California material in the same manner is soft, easily crumbled and of little physical strength.

Inasmuch as a magnesite brick belongs to the class of so-called basic refractories, the magnesia (MgO) or basic contents should be as high as possible, for, other things being equal, the higher the percentage of magnesia (MgO) the better the refractory. It is therefore apparent that if a magnesite of either of the California analyses could be treated in such a manner as to have the same necessary physical qualities possessed by the Austrian magnesite, a superior refractory material would be produced therefrom. It is also a fact, demonstrated by practical experience, that a very small increase in the magnesia (MgO) contents of a magnesite refractory has a great effect in improving the quality, provided the necessary physical strength and density is not sacrificed.

Silica, which at high temperature has a strong acid character and unites actively with the magnesia (MgO), forming a hard, dense, glassy compound, is an undesirable constituent owing to the destruction of the basic character of the magnesia (MgO) and any effort to cause a proper bond by its use is not productive of good results commercially. It is, therefore, not permissible to obtain the desired physical properties in a California magnesite by adding silica, especially in view of the fact that most California magnesites already naturally contain as much silica as is allowable (6% on a calcined basis), California magnesite #2 being the average California magnesite, and this applies to other magnesite mined in the Western States.

My invention comprises a method for obtaining a higher magnesia (MgO) content than is possible by present known commercial methods for the manufacture of magnesite refractories with the desired steel hardness, strength and density necessary in practical commercial use, and the same consists in adding small quantities of some ferric oxid in the form of iron ore, mill scale or other iron compounds together with some metallic deoxidizer, such as ferro manganese, to the refractory material before the same is fired in the kiln, by which means the total quantity of oxygen associated with the iron present is reduced in accordance with the following equation:

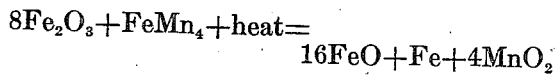
$$8Fe_2O_3 + FeMn_4 + heat = 16FeO + Fe + 4MnO_2$$

It will be seen from the above equation that the ferric iron is reduced to ferrous iron and some of the metallic iron liberated, and that the ferro maganese required to complete the reaction is theoretically about $21\frac{1}{2}\%$ by weight of the ferric iron present. At the same time the manganese is oxidized to manganese dioxid. The ferrous and metallic iron being more active fluxes or bonding agents than the ferric iron, the result of the addition of the ferro manganese is that in the heat of the kiln used in the process of manufacture of the refractory a more energetic reaction occurs between the iron compounds, magnesia (MgO), and other substances present, such as silica, and lime, than would be the case if the ferric iron alone was present. The main function of the manganese contained in the ferro manganese is to reduce the ferric oxid present, the oxid of manganese thus liberated probably forming a complex compound with the other elements present. The dark color of the refractories manufactured by my process indicates the correctness of this last statement, and the magnetic properties, which are stronger than those developed in the same magnesite with the same quantity of iron alone added further substantiates the correctness of the equations, as the formation of the metallic and ferrous irons would necessarily increase the magnetic property of the material. The presence of free oxygen which would prevent the reduction of ferric oxid by ferro manganese is prevented, first, by the non-porous structure of the mass in which the reaction occurs, and secondly, by the liberation of free carbonic acid gas from the magnesite which fills what pores there are in the mass.

Any other suitable metallic deoxidizer can be used in place of ferro manganese, although the latter is the one actually used in present manufacture.

In carrying out my invention uncalcined magnesite with as high a percentage of magnesium carbonate ($MgCO_3$) as possible is utilized. Ores which when calcined contain from 90 to 95% magnesia (MgO) are readily obtainable in the western United States. The uncalcined ore is broken down to about egg size, and is then put into a wet pan and ground up with water and with from .32% to .75% of its weight of previously powdered ferro maganese and from 1.5% to 2.5% of its weight of ferric oxid in the form of powdered iron ore as low in impurities as is commercially obtainable, or as mill scale, or any other commercial obtainable form of iron oxid. The grinding in the wet pan is continued until a plastic mass is formed, which is then molded into bricks of convenient size. These bricks are then dried in accordance with usual methods employed and are then fired to a temperature not less than Seger cone 18. When these bricks are removed from the kiln all the carbonic acid gas which was associated with the magnesia (MgO) has been driven off and a thorough reaction has occurred between the various constituents, resulting in the formation of a dense, hard compound of a deep brown color.

These bricks so formed are broken up to suitable mesh and either sold in this form, known as "grain magnesite", or when finely powdered as "magnesite cement", or else the "grain magnesite" is thrown back into the wet pan and ground for sufficient length of time with water to yield a plastic mass, which is again molded into bricks or shapes, dried and fired in the usual manner to a temperature between cone 18 and cone 20. After being slowly cooled, these bricks or shapes are the finished product of commerce.

Although I have found this procedure just described to be preferable, still considerable variation is possible in the process without departing from the spirit of my invention. For example: magnesite having been previously calcined in a stack or rotary kiln in accordance with regular practice without the addition of any other materials, can be substituted for the uncalcined magnesite, and the powdered iron material and ferro manganese can be added direct to this calcined magnesite in the wet pan, and final bricks or shapes molded, dried and fired from this material in the usual manner. The objection to this method is that owing to the dense nature of calcined magnesite as compared to the uncalcined, the iron and ferro manganese do not combine so readily with the former as with the latter, but this defect can be remedied to a certain extent by adding to the calcined magnesite about 10% of the uncalcined material.

However, if so desired, the raw or calcined magnesite having first been mixed with the iron oxid and ferro manganese and all ground to pass a 60 mesh screen can be calcined in a rotary kiln, and this material, after being ground to suitable mesh, can either be sold as magnesite grain material, or by the further process above described, made into bricks or shapes.

The amount of iron oxid to be added is not a fixed quantity, but is dependent upon the amount originally occurring in the magnesite. It is desirable that the finished refractory should contain from 3 to 5% of iron figured as $Fe_2O_3$, and sufficient iron ore or other iron compound is added to bring the total up to this point. If the original ore naturally contains this much iron, it will not be necessary to add thereto. In such case the ferro manganese alone is added, and this reacts with the naturally contained iron in the same manner as with added iron oxid.

By the addition of ferro manganese a magnesite refractory containing from 3 to 5% iron figured as ferric oxid and 89 to 92% magnesia (MgO) acquires when fired in the usual manner to cone 18 to 20 in any suitable form of kiln a dense, hard and strong structure necessary in practical use; while without the addition of the ferro manganese the same magnesite refractory after the same treatment possesses a loose, weak and soft structure.

In order to obtain the necessary physical property without the addition of the ferro manganese, from 8 to 10% of iron figured as ferric oxid is needed, resulting at the same time in the magnesia (MgO) contents being reduced to 84 to 85%, thus greatly lessening the effective basic nature of the refractory.

By means of the above described invention I am able to produce commercial magnesite refractories possessing hard, dense and strong physical properties and which contain higher percentages of the basic element magnesia (MgO) than is possible by other known methods, and which, therefore, are more durable and efficient than any others now known.

Having thus described my invention, what I claim as new and desire to protect by Letters Patent is:—

1. The process of treating magnesite in admixture with ferric oxid for the production of magnesite refractories, which consists in intermixing with the said magnesite a ferro alloy, and then heating the mixture so formed to a temperature sufficiently high to cause the ferro alloy to react with the constituents of the magnesite.

2. The process of treating magnesite deficient in ferric oxid for the production of magnesite refractories, which consists in intermixing with the magnesite ferric oxid and ferro alloy, and then heating the mixture so formed to a temperature sufficient to cause the ferric oxid and the ferro alloy to react with the constituents of the magnesite.

3. The process of treating magnesite having intermixed therewith ferric oxid for the production of magnesite refractories, which consists in intermixing with the said magnesite a metallic deoxidizer, thence heating the mixture so formed to a temperature sufficient to cause the metallic deoxidizer to react with the constituents of the magnesite.

4. The process of treating magnesite deficient in ferric oxid for the production of magnesite refractories, which consists in intermixing with the magnesite ferric oxid and a metallic deoxidizer and then heating the mixture so formed to a temperature sufficient to cause the ferric oxid and the metallic deoxidizer to react with the constituents of the magnesite.

5. The process of treating magnesite having intermixed therewith ferric oxid for the production of magnesite refractories, which consists in making a plastic compound by grinding said magnesite, a ferro alloy and water together, forming the said compound into bricks, and thence burning the bricks at a temperature sufficient to drive off the moisture contained therein and to cause the ferro alloy to react with the constituents of the magnesite.

6. The process of manufacturing magnesite refractory bricks, which consists in making a plastic brick compound by grinding magnesite and ferric oxid, a ferro alloy and water together, thence forming said compound into bricks, burning the bricks to drive off the moisture and cause the ferro alloy to react with the magnesite and the ferric oxid, thence crushing the bricks and grinding the crushed bricks with water to form a plastic compound, shaping said compound and burning the same, substantially as described.

7. The process of manufacturing magnesite refractories which consists in intermixing magnesite, ferric oxid and a ferro alloy, subjecting the same to heat sufficient to cause the ferro alloy to react with the magnesite and the ferric oxid for the production of a sintered mass, then comminuting the said mass and forming the same into suitable shapes, and thence burning the same for the production of the desired refractory.

8. The process of manufacturing magnesite refractories which consists in intermixing magnesite, ferric oxid and a ferro alloy, subjecting the same to heat sufficient to cause the ferro alloy to react with the magnesite and the ferric oxid for the production of a sintered mass, and thence forming the said mass into a suitable shape.

In testimony whereof I have signed my name to this specification in the presence of two subscribing witnesses.

ROBERT D. PIKE.

Witnesses:
  PERCY S. WEBSTER,
  M. R. MILIN.